United States Patent
Delker et al.

(10) Patent No.: US 9,015,620 B1
(45) Date of Patent: Apr. 21, 2015

(54) USER INTERFACE NAVIGATION

(75) Inventors: Jason R. Delker, Olathe, KS (US); John M. Everson, Leawood, KS (US); Wing K. Lee, Ashburn, VA (US); Jason K. Whitney, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 2091 days.

(21) Appl. No.: 12/031,419

(22) Filed: Feb. 14, 2008

(51) Int. Cl.
G06F 3/048 (2013.01)
G06F 3/0482 (2013.01)
G06F 3/0481 (2013.01)

(52) U.S. Cl.
CPC ............ *G06F 3/0482* (2013.01); *G06F 3/0481* (2013.01)

(58) Field of Classification Search
CPC ...................................... G06F 3/0481
USPC .................. 715/810, 817, 821, 825, 828, 830
See application file for complete search history.

(56) References Cited

U.S. PATENT DOCUMENTS

| | | | |
|---|---|---|---|
| 5,956,035 A * | 9/1999 | Sciammarella et al. | 715/815 |
| 6,469,719 B1 * | 10/2002 | Kino et al. | 715/810 |
| 6,753,892 B2 * | 6/2004 | Chung | 715/810 |
| 6,842,653 B2 * | 1/2005 | Weishut et al. | 700/83 |
| 6,907,575 B2 * | 6/2005 | Duarte | 715/784 |
| 7,030,889 B2 * | 4/2006 | Hamada et al. | 345/619 |
| 7,188,320 B1 | 3/2007 | Landers | |
| 7,657,843 B2 * | 2/2010 | White | 715/810 |
| 2002/0163543 A1 * | 11/2002 | Oshikiri | 345/810 |
| 2003/0169301 A1 * | 9/2003 | McCauley et al. | 345/810 |
| 2005/0216859 A1 * | 9/2005 | Paek et al. | 715/810 |
| 2006/0248474 A1 * | 11/2006 | Kimotsuki | 715/810 |

OTHER PUBLICATIONS

Hunter, Kevin E. et al., "Method and System for Controlling Navigation Through Items in a Table", filed Jul. 1, 2004, U.S. Appl. No. 10/882,936, Specification (27 pgs.) and Drawings (4 sheets).

* cited by examiner

*Primary Examiner* — Tadeese Hailu

(57) ABSTRACT

A computer implemented method for user interface navigation engine is provided. A number of items to display is determined based on an interface screen parameter. The number of items is displayed based on the numerical position on a list selected for display. A displayed item is highlighted, wherein a position of the highlighted displayed item on a screen indicates a position relation of the displayed number of items to the count of items in the list.

20 Claims, 7 Drawing Sheets

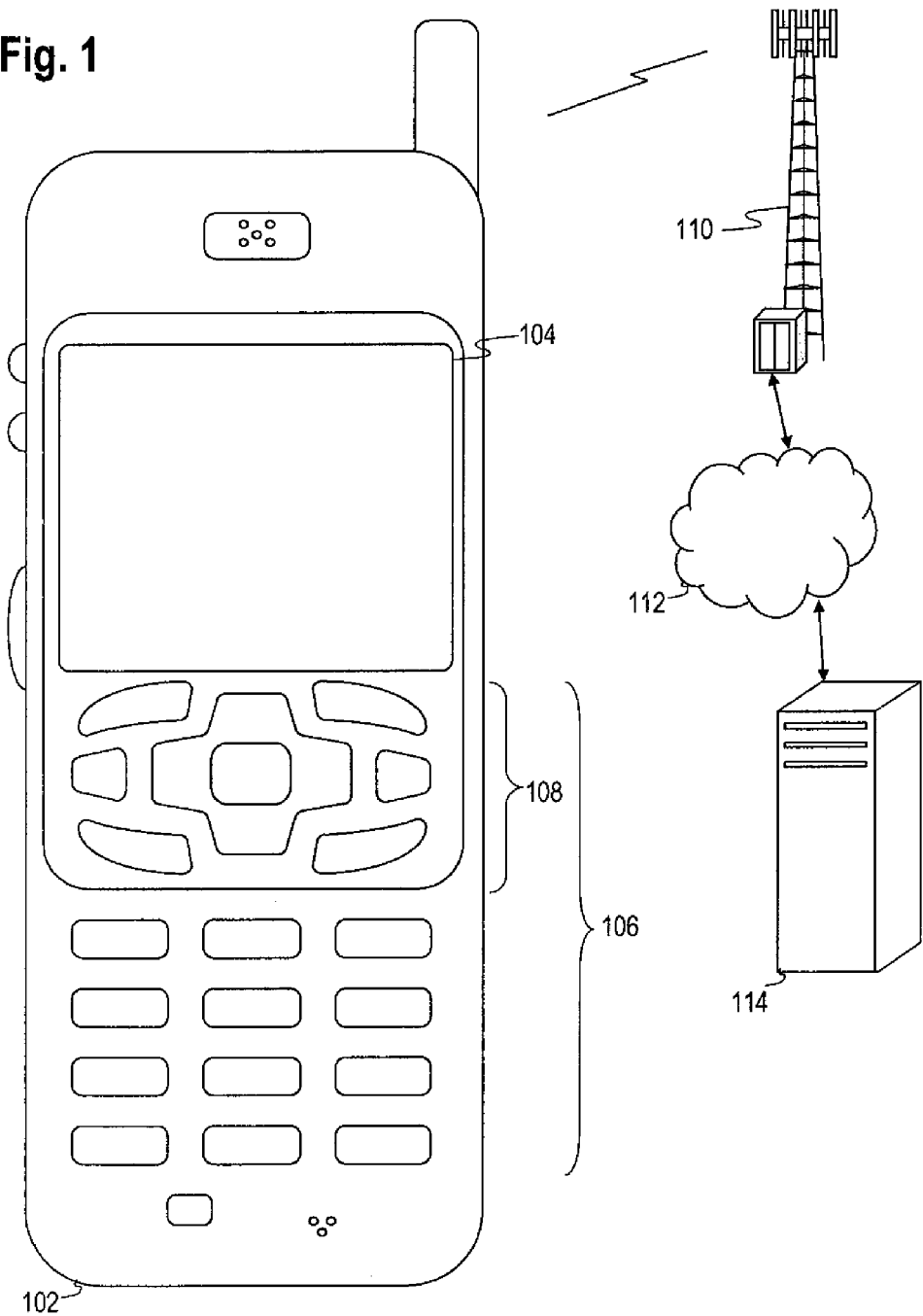

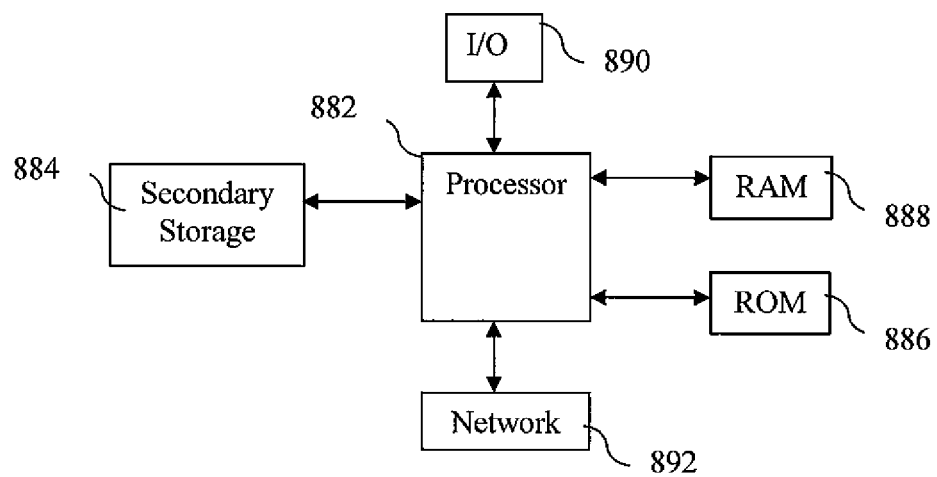

USER INTERFACE NAVIGATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A computer or electronic device user may use various navigation devices to traverse through menu items and pages displayed by an interface screen to locate specific information or content. These navigation devices may include a mouse, a touch pad, a wheel, a scroll bar, and a slider. However, a computer or electronic device user may be dissatisfied with the functioning of these navigation devices for their electronic device. A user may become frustrated or confused navigating through menu options and pages to locate content on an electronic device without the benefit of a user-friendly navigation device. Furthermore, electronic devices that have smaller interface screens, such as mobile phones and personal digital assistants, may not even have a mouse, a touch pad, a wheel, a scroll bar, or a slider.

SUMMARY

Accordingly, there is provided herein systems and methods for user interface navigation. In some method embodiments, a number of items to display is determined based on an interface screen parameter. The number of items is displayed based on the numerical position on a list selected for display. A displayed item is highlighted based on, wherein a position of the highlighted displayed item on a screen indicates a position relation of the displayed number of items to the count of items in the list.

Some system embodiments include a processor and a user interface. When executed by the processor, the user interface displays a menu area and a content area, wherein the menu area comprises at least a first level of menu items and the content area comprises content corresponding to a lowest level of menu items. The user interface determines a number of menu items to display based on an interface screen parameter and displays the number of menu items based on a numerical position on the first level of menu items. Additionally, the user interface highlights a displayed menu item, wherein a position of the highlighted displayed menu item on a screen indicates a position relation of the displayed number of menu items to a count of items in the first level of menu items. The user interface also adds a second level of menu items to the menu area in response to a user focus on the first level of menu items, wherein the second level is a lower level than the first level.

Some system embodiments include a processor and a user interface. When executed by the processor, the user interface displays a menu area and a content area, wherein the menu area comprises a first level of menu items and a second level of menu items, and the content area comprises content corresponding to the second level of menu items, wherein the second level is a lower level than the first level. The user interface determines a number of menu items to display based on an interface screen parameter and displays the number of menu items based on a numerical position on the second level of menu items. Additionally, the user interface highlights a displayed menu item, wherein a position of the highlighted displayed menu item on a screen indicates a position relation of the displayed number of menu items to a count of items in the second level of menu items. The user interface also displays menu items in the second level of menu items, wherein the displayed menu items correspond to a user position in the first level of menu items.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 1 illustrates an exemplary wireless communications system according to some embodiments of the disclosure.

FIG. 2 B illustrates another exemplary interface screen for a device according to some embodiments of the disclosure.

FIG. 2 C illustrates another exemplary interface screen for a device according to some embodiments of the disclosure.

FIG. 2 D illustrates another exemplary interface screen for a device according to some embodiments of the disclosure.

FIG. 2 E illustrates another exemplary interface screen for a device according to some embodiments of the disclosure.

FIG. 2 F illustrates another exemplary interface screen for a device according to some embodiments of the disclosure.

FIG. 3 B illustrates another exemplary interface screen for a device according to some embodiments of the disclosure.

FIG. 3 C illustrates another exemplary interface screen for a device according to some embodiments of the disclosure.

FIG. 8 illustrates an exemplary general purpose computer system suitable for implementing the several embodiments of the disclosure.

DETAILED DESCRIPTION

Figure 2A:
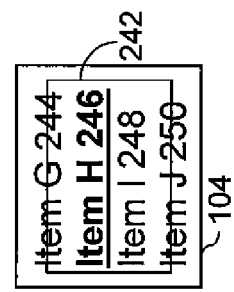
FIG. 2 A illustrates an exemplary interface screen for a device according to some embodiments of the disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

In some embodiments, a user interface highlights a displayed item to indicate a position relation of the displayed items from a list to the total number of items in the list. For example, if the user interface is displaying items numbered 17 to 21 from a list of 26 items, the user interface highlights the fourth of the displayed items. The user interface displays three non-highlighted above the highlighted fourth item and one non-highlighted item below the highlighted item. This ratio of three items above to one item below represents the approximate ratio of 16 non-displayed items above the displayed items to the 5 non-displayed items below the displayed items. Without the use of a slider element displayed off to the side of the user interface, a device user may view the position of the highlighted item to determine where the displayed items are located in the list of all items, which may assist the user in deciding if a current method of traversing the items in the list is proceeding quickly enough to satisfy the user. This simplified user interface may display items using a focus element that increases the user's attention to some displayed items while reducing the user's attention to other displayed items. The focus element may modify the font size, transparency level, brightness level, and/or contrast level between displayed items in the focus element and displayed items that are not in the focus element to achieve a focus or fade effect. The position of the highlighted item relative to the focus element may more accurately represent the approximate ratio of non-displayed items above the displayed items to the non-displayed items below the displayed items.

In some embodiments the user interface displays a menu area and a content area, wherein the menu area includes a level of menu items and the content area includes content corresponding to the menu items. When a user focuses on a menu item, the user interface adds another level of menu items to the menu area, and the content in the content area corresponds to the added level of menu items. A user may focus on the menu item, or move a cursor or pointer to the menu item, by the use of keys and/or a directional pad, without selecting the menu item. The user may also select the focused menu item by the use of keys and/or the directional pad. By adding another level of menu items to the previously displayed level of menu items, the user interface enables a user to simultaneously view currently available menu items, previously available menu items, and selectable content items, which provide the user with an overview of previous selections and potential selections. The user interface may highlight previous selections from previous levels of menu items to enable the user to view the set of selections that produced the current display of menu items. Since content items are displayed, the user may bypass potential menu items to directly select a content item.

In some embodiments the user interface displays a menu area and a content area, wherein the menu area includes multiple levels of menu items and the content area includes content corresponding to the lowest level of menu items. Even when the user has focused on, but not yet selected, a menu item from a higher level of menu items, the user interface displays menu items in a lower level of menu items that correspond to the user's position in the higher level of menu items. By displaying the menu items in the lower level that correspond to the user's position in the higher level of menu items, the user interface offers a preview of the menu items in the lower level that will be selectable if the user selects the current menu item from the higher level. The user interface may highlight a potential menu item in the lower level to indicate the first menu item that will be available for selection in response to a selection of the currently available menu item.

FIG. 1 illustrates an exemplary wireless communications system including the device 102. FIG. 1 depicts the device 102, which is operable for implementing aspects of the present disclosure, but the present disclosure should not be limited to these implementations. Though illustrated as a mobile phone, the device 102 may take various forms including a wireless device, a pager, a personal digital assistant (PDA), a portable computer, a tablet computer, or a laptop computer. Many suitable devices combine some or all of these functions. In some embodiments of the present disclosure, the device 102 is not a general purpose computing device like a portable, laptop or tablet computer, but rather is a special-purpose communications device such as a mobile phone, wireless device, pager, or PDA. The device 102 may support specialized activities such as gaming, inventory control, job control, and/or task management functions, and so on.

The device 102 includes a display 104 and a touch-sensitive surface or keys 106 for input by a user. The touch-sensitive surface or keys 106 may include a directional pad 108 that enables a user to make directional selections. A device user may use the directional pad 108 to change a view of the contents of the display 104. The device 102 may present options for the user to select, controls for the user to actuate, and/or cursors or other indicators for the user to direct. The device 102 may further accept data entry from the user, including numbers to dial or various parameter values for configuring the operation of the device. The device 102 may further execute one or more software or firmware applications in response to user commands. These applications may configure the device 102 to perform various customized functions in response to user interaction. Additionally, the device 102 may be programmed and/or configured over-the-air, for example from a wireless base station, a wireless access point, or a peer device 102.

The device 102 may execute a web browser application which enables the display 104 to show a web page. The web page may be obtained via wireless communications with a base transceiver station 110, a wireless network access node, a peer device 102 or any other wireless communication network or system. The cell tower 110 (or wireless network access node) is coupled to a wired network 112, such as the Internet. Via the wireless link and the wired network, the device 102 has access to information on various servers, such as a server 114. The server 114 may provide content that may be shown on the display 104. Alternatively, the device 102 may access the base transceiver station 110 through a peer device 102 acting as an intermediary, in a relay type or hop type of connection.

FIGS. 2 A-E illustrate exemplary interface screens for a device according to some embodiments of the disclosure. An interface screen is a set of visual data output to a device user through the display 104. Five interface screens are shown for the purposes of illustrative examples of user interface navigation for interface screens. Interface screen navigation is the moving around within a system of graphic user interfaces. Navigation may be changing from one set of content to another set of content based upon user input through the keys 106 and/or the directional pad 108.

For example, FIG. 2A depicts five items that are visible to the device user through the display 104: item A 202, item B 204, item C 206, item D 208, and item E 210. Although the device user may be aware that items 202-210 are the first items in a list of items that may be displayed, the device user may not know how many additional items may be displayed based upon user input through the keys 106 and/or the directional pad 108. The display 104 may indicate that the user has currently focused on item A 202 by underlining the text for item A 202. The display 104 may also highlight the item A 202 to indicate a position relation by depicting the text for item A 202 in bold font. Underlining text and depicting text in bold font are examples of methods that may be used to indicate a focused item or to indicate a position relation. Other methods include modifying a font size, a transparency level, a brightness level, and/or a contrast level for an item. By depicting the first of the five items in bold font, the display 104 is indicating to the device user that the displayed items 202-210 represent approximately the first of five ranges for the total items that may be depicted.

Figure 2B:
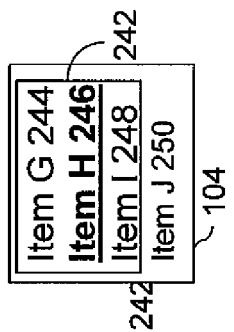

In another example, FIG. 2B depicts five items that are visible to the device user through the display 104: item K 212, item L 214, item M 216, item N 218, and item O 220. Although the device user may be aware that items 212-220 are between the first item and the last item in a list of items that may be displayed, the device user may not know how many additional items may be displayed based upon user input through the keys 106 and/or the directional pad 108. The display 104 may indicate that the user has currently focused on item O 220 by underlining the text for item O 220. The display 104 may also highlight the item M 216 to indicate a position relation by depicting the text for item M 216 in bold font. By depicting the third of the five items in bold font, the display 104 is indicating to the device user that the five depicted items represent approximately the third of five ranges for the total items that may be depicted. The third of five ranges indicates that the list of items that may be displayed includes approximately the same number of items above the displayed items with the number of items below the displayed items. In this example, the two ranges represented by the items 212 and 214 that are depicted above the highlighted item M 216 represent 10 items, while the two ranges represented by the items 218 and 220 that are depicted below the highlighted item M 216 represent 11 items. For this example, the middle of five ranges cannot represent exactly the same number of items above the displayed items and exactly the same number of items below the displayed items because the 21 un-displayed items may not be divided exactly into two ranges of items. However, by depicting the third of five ranges in bold font, the display 104 gives the mobile user an indication of approximately where the displayed items 212-220 are in relation to the un-displayed items in the list of items.

Figure 2C:
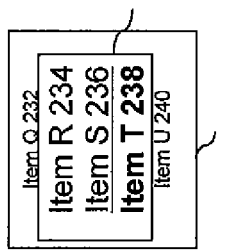

In yet another example, FIG. 2C depicts five items that are visible to the device user through the display 104: item V 222, item W 224, item X 226, item Y 228, and item Z 230. Although the device user may be aware that items 222-230 are the last items in a list of items that may be displayed, the device user may not know how many additional items may be displayed based upon user input through the keys 106 and/or the directional pad 108. The display 104 may indicate that the user has currently focused on item Z 230 by underlining the text for item Z 230. The display 104 may also highlight the item Z 230 to indicate a position relation by depicting the text for item Z 230 in bold font. By depicting the fifth of the five items in bold font, the display 104 is indicating to the device user that the five depicted items represent approximately the last of five ranges for the total items that may be depicted.

Figure 2D:
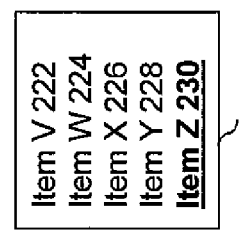

In an additional example, FIG. 2D depicts five items that are visible to the device user through the display 104: item Q 232, item R 234, item S 236, item T 238, and item U 240. Although the device user may be aware that items 232-240 are between the first item and the last item in a list of items that may be displayed, the device user may not know how many additional items may be displayed based upon user input through the keys 106 and/or the directional pad 108. The display 104 may indicate that the user has currently focused on item S 236 by underlining the text for item S 236. The display 104 may also highlight the item T 238 to indicate a position relation by depicting the text for item T 238 in bold font. By depicting the fourth of the five items in bold font, the display 104 is indicating to the device user that the five depicted items represent approximately the fourth of five ranges of the total items that may be depicted. The fourth of five ranges indicates three ranges above the displayed items and one range below the displayed items. The ratio of three ranges above to one range below means that the list of items that may be displayed includes approximately three times as many items above the displayed items in comparison to the number of items below the displayed items. In this example, the three ranges above represented by items 232-236 include 16 items, while the one range below represented by item 240 includes 5 items. For this example, the fourth of five ranges cannot represent exactly a three to one ratio between the number of items above the displayed items and the number of items below the displayed items because the 21 un-displayed items may not be divided into an exact three to one ratio. However, by depicting the fourth of five ranges in bold font, the display 104 gives the mobile user an indication of approximately where the displayed items 232-240 are in relation to the un-displayed items in the list.

The display 104 may also include a focus element 242, which focuses the attention of a user on the items within the focus element 242 by fading the displayed items that are outside of the focus element 242. For example, the item Q 232 and the item U 240 are outside the focus element 242 while the item R 234, the item S 236, and the item T 238 are inside the focus element 242. The items 232 and 240 that are outside the focus element 242 are depicted in smaller font than the items 234-238 that are inside the focus element 242, which appears to make the outside items 232 and 240 fade into the distance. In addition to decreased font size, the display 104 may fade items outside the focus element 242 by increasing a transparency level, decreasing a brightness level, or decreasing a contrast level. The focus element 242 may include the item currently focused on by the user and the item that indicates the position relation of the displayed items, but not all displayed items. The focus element 242 enables a user to view the items that precede and follow the items displayed in the focus element 242 while retaining much of the interface screen space for the items displayed in the focus element 242.

Figure 2E:
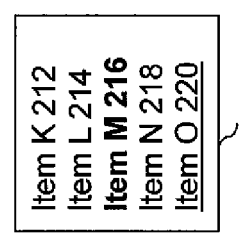

In another example, FIG. 2E depicts four items that are visible to the device user through the display 104: item G 244, item H 246, item I 248, and item J 250. In this example, the user has configured the interface screen parameters based on user preferences for larger font items, which results in the display 104 having sufficient space to depict only four full items, the items 244-250. In FIG. 2E, the item J 250 is not in the focus element 242. Although the device user may be aware that items 244-250 are between the first item and the last item in a list of items that may be displayed, the device user may not know how many additional items may be displayed based upon user input through the keys 106 and/or the directional pad 108. The display 104 may indicate that the user has currently focused on item H 246 by underlining the text for item H 246. The display 104 may also highlight the item H 246 to indicate a position relation by depicting the text for item H 246 in bold font.

Because the second of the four items 244-250 is depicted in bold font, the display 104 indicates to the device user that the four displayed items 244-250 represent approximately the second of four ranges for the total items that may be depicted. One displayed item G 244 above the highlighted item H 246 represents one range above the displayed items 244-250 while the two displayed items I 248 and J 250 below the highlighted item H 246 represent two ranges below the displayed items 244-250. These ranges indicate that the list of items that may be displayed includes approximately a ratio of one item above the items 244-250 for every two items below the displayed items 244-250. In this example, the range represented by the item G 244 that is depicted above the highlighted item H 246 represents 6 items, while the ranges represented by the items I 248 and J 250 that are depicted below the highlighted item H 246 represents 16 items. For this example, the ranges do not represent the exact ratio of the number of items above the displayed items 244-250 compared to the number of items below the displayed items 244-250. However, by depicting the second of four ranges in bold font, the focus element 242 gives the mobile user an indication of approximately where the displayed items 244-250 are in relation to the un-displayed items in the list of items.

Figure 2F:
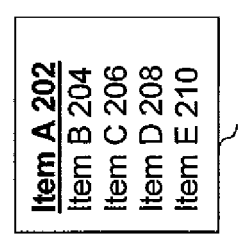

FIG. 2F depicts that the position of the highlighted displayed item H 246 may be relative to the focus element 242, rather than only to the displayed number of items 244-250, to indicate approximately where the displayed items 244-250 are in relation to the un-displayed items in the list of items. The display 104 may position the highlighted displayed item H 246 relative to the focus element 242 by shifting the focus element 242 downward, for example by half an item. As a result, half of the item G 244 may be out of the focus element 242 and half of the item J 250 may be in the focus element 242. This positioning of the highlighted item H 246 relative to the focus element 242 improves the indication of approximately where the displayed items 244-250 are in relation to the un-displayed items in the list of items. One half of the item G 244 is in the focus element 242 above the highlighted item H 246 while the item I 248 and one half of the item J 250 are in the focus element below the highlighted item H 246. The ratio of one half of an item in the focus element 242 above the highlighted item H 246 to one and a half items in the focus element 242 below the highlighted item H 246 indicates that the list of items that may be displayed includes approximately one item above the displayed items 244-250 for every three items below the displayed items 244-250 (the ratio of one half to one and a half equals the ratio of one to three). By the depiction of half items in the focus element 242, the display 104 depicts the equivalent of one half range above the highlighted item H 246 relative to three half ranges (one and a half ranges) below the highlighted item H 246. In this example, the one half range above represented by one half of the item G 244 in the focus element 242 indicates 6 items above the displayed items 244-250, while the three half ranges below represented by the item I 248 and half of the J 250 in the focus element 242 indicates 16 items below the displayed items 244-250.

In FIG. 2E, the second of four ranges less accurately represented one item above the displayed items 244-250 for every two items below the displayed items 244-250. (The ratio of 1 to 2 less accurately approximates the ratio of 6 to 16, which is 1 to 2.67.) The ratio of one half range to three half ranges in FIG. 2F more accurately approximates the ratio of 6 items above the displayed items 244-250 to 16 items below the displayed items 244-250. (The ratio of 1 to 3 more accurately approximates the ratio of 6 to 16, or 1 to 2.67, because 3 more accurately approximates 2.67 than 2 does.)

In the description of FIG. 2F, the ratio of the number of items in the focus element 242 above the displayed items 244-250 to the number of items in the focus element 242 below the displayed items 244-250 is not exactly the ratio of one to three as indicated by the depiction of half items G 244 and J 250 in the focus element 242. However, the display 104 could depict ranges that represent the exact ratio of items in the list above the displayed items 244-250 to the items in the list below the displayed items 244-250 by depicting six-elevenths of the item G 244, the item H 246, the item I 248, and five-elevenths of the item 250 in the focus element 242. The full item I 248 represents eleven-elevenths of an item, and adding eleven-elevenths of the full item I 248 to the five-elevenths of item J 250 results in sixteen elevenths of an item (eleven-elevenths plus five-elevenths equals sixteen elevenths). This depiction could result in six-elevenths of the item G 244 in the focus element 242 above the highlighted item H 246 and sixteen-elevenths of the items I 248 and J 250 in the focus element 242 below the highlighted item H 246, which equals the exact ratio of 6 items in the list above the displayed items 244-250 to 16 items in the list below the displayed items 244-250. By shifting an exact fraction of an item out of the focus element 242 and shifting the exact fraction of another item into the focus element 242, the display 104 may give the mobile user an exact indication of where the displayed items 244-250 are in relation to the un-displayed items in the list.

FIGS. 3 A-C illustrate other exemplary interface screens for a device according to some embodiments of the disclosure. Each of the interface screens may include multiple display areas. A display area is a space reserved for representing data on an interface screen. Each display area may display a variable amount of information, with each individual display area displaying a distinct set of information, such as menu items and content items. Each menu item and each content item may be associated with an action to take when a device user uses the keys 106 or the directional pad 108 to select the associated menu item or content item.

Figure 3A:
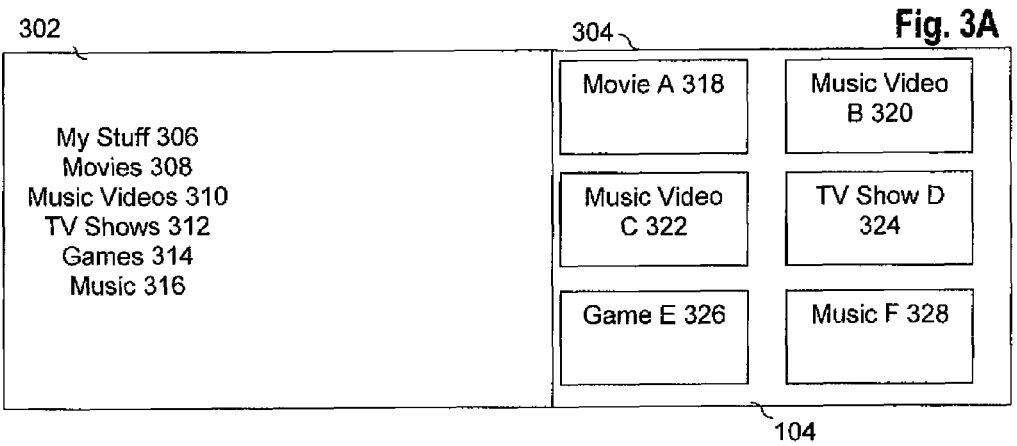
FIG. 3 A illustrates another exemplary interface screen for a device according to some embodiments of the disclosure.

FIG. 3A includes the display 104 that depicts two display areas, a menu area 302 and a content area 304. The menu area 302 includes five menu items: my stuff 306, movies 308, music videos 310, TV shows 312, games 314, and music 316. The user may focus on any of the menu items 306-316 to display more menu items associated with their focus. For example, in response to the user focusing on my stuff 306, the display 104 may display menu items associated with content that the user has already purchased or leased, such as the user's favorite movies, favorite music videos, favorite TV shows, favorite games, and favorite music. In response to the user focusing on movies 308, the display 104 may display menu items associated with movies that are available for lease or purchase, in addition to movies that the user has already leased or purchased. In response to the user focusing on music videos 310, the display 104 may display menu items associated with music videos that are available for lease or purchase, in addition to music videos that the user has already leased or purchased. In response to the user focusing on TV shows 312, the display 104 may display menu items associated with TV shows that are available for lease or purchase, in addition to TV shows that the user has already leased or purchased. In response to the user focusing on games 314, the display 104 may display menu items associated with games that are available for lease or purchase, in addition to games that the user has already leased or purchased. In response to the user focusing on music 316, the display 104 may display menu items associated with music that are available for lease or purchase, in addition to music that the user has already leased or purchased.

The content area 304 in FIG. 3A includes six content items: movie A 318, music video B 320, music video C 322, TV show ID 324, game E 326, and music F 328. The content items 318-328 may be content that the user has already leased or purchased, and may be associated with user focus on the menu item my stuff 306. The display 104 may depict the content items 318-328 by displaying a thumbnail of the box art associated with each of the content items 318-328. A thumbnail is a reduced-size version of an image used to make it easier for a device user to scan and recognize images, serving the same role for images as a normal text index does for words. For example, the display 104 depicts a reduced-size version of the box art for the movie A 318, which may be reduced-size images of actors, actresses, and an action scene on the box in which a digital video disc of the movie A 318 is sold. In response to the user selecting movie A 318, the device 102 may prompt the user with options to play the movie A 318. Similarly, in response to the user selecting the content items 320-328, the display 104 may prompt the user with options to play the content items 320-328.

FIG. 3 B includes the display 104 that depicts the menu area 302, the content area 304, and a second menu area 330. The display 104 may display the second menu area in response to a user focus on one of the menu items 306-316 listed in the menu area 302. The second menu area 330 includes eleven menu items: new releases 332, most popular 334, highest rated 336, recommended 338, action/adventure 340, anime/animation 342, award winners 344, children/family 346, classics 348, comedy 350, and drama 352. The menu items 332-352 may be menu items associated with the user focus on the menu item movies 308.

Figure 3B:
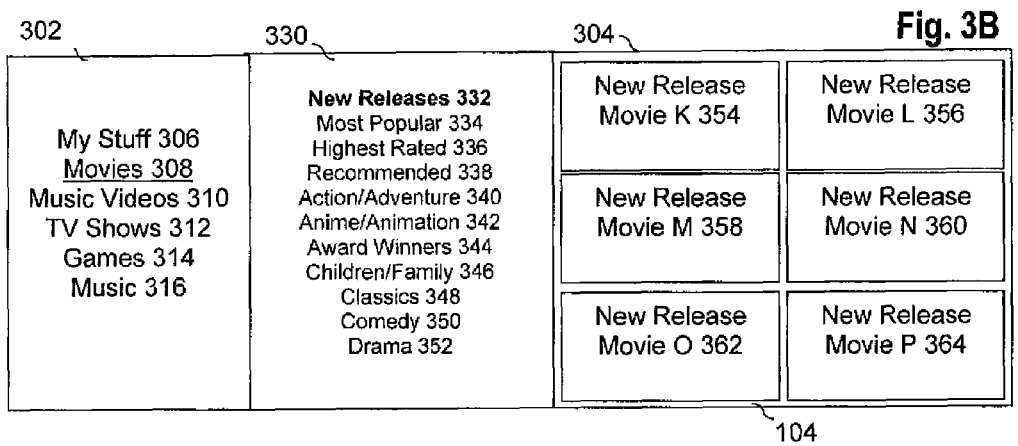

The content area 304 in FIG. 3B includes six content items: new release movie K 354, new release movie L 356, new release movie M 358, new release movie N 360, new release movie O 362, and new release movie P 364. The content items 354-364 may be content associated with a default user focus on the menu item new releases 332. A default user focus is the first user focus available in response to a current user focus. For example, in response to the user focusing on the menu item movies 308, the first option the user has is to focus on the menu item new releases 332. The display 104 may depict the content items 354-364 by displaying a thumbnail of the box art associated with each of the content items 354-364. The user may use the keys 106 and/or the directional pad 108 to directly select the new release movie K 354 without selecting from either the menu area 302 or the second menu area 330.

Figure 3C:
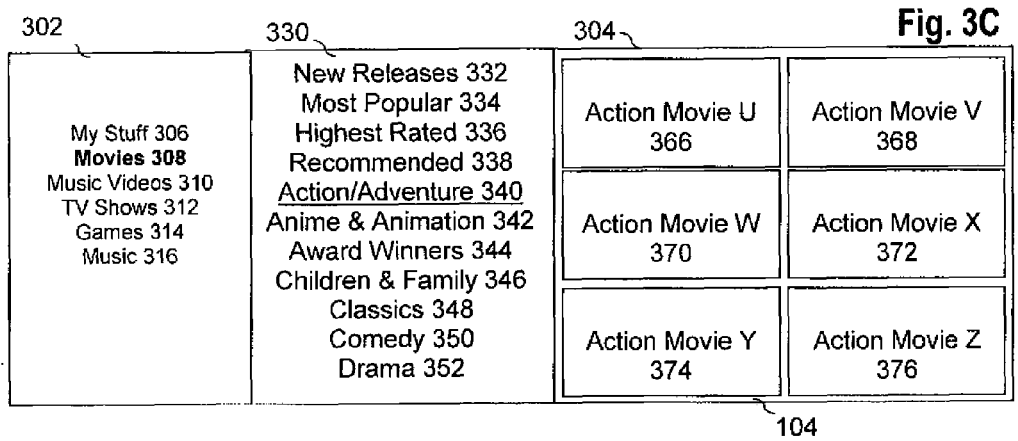

FIG. 3 C includes the display 104 that depicts the menu area 302, the second menu area 330, and the content area 304. The content area 304 in FIG. 3C includes six content items: action movie U 366, action movie V 368, action movie W 370, action movie X 372, action movie Y 374, and action movie Z 376. The content items 366-376 may be content associated with a user focus on the menu item action/adventure 340. The display 104 may depict the content items 366-376 by displaying a thumbnail of the box art associated with each of the content items 366-376.

Figure 4:
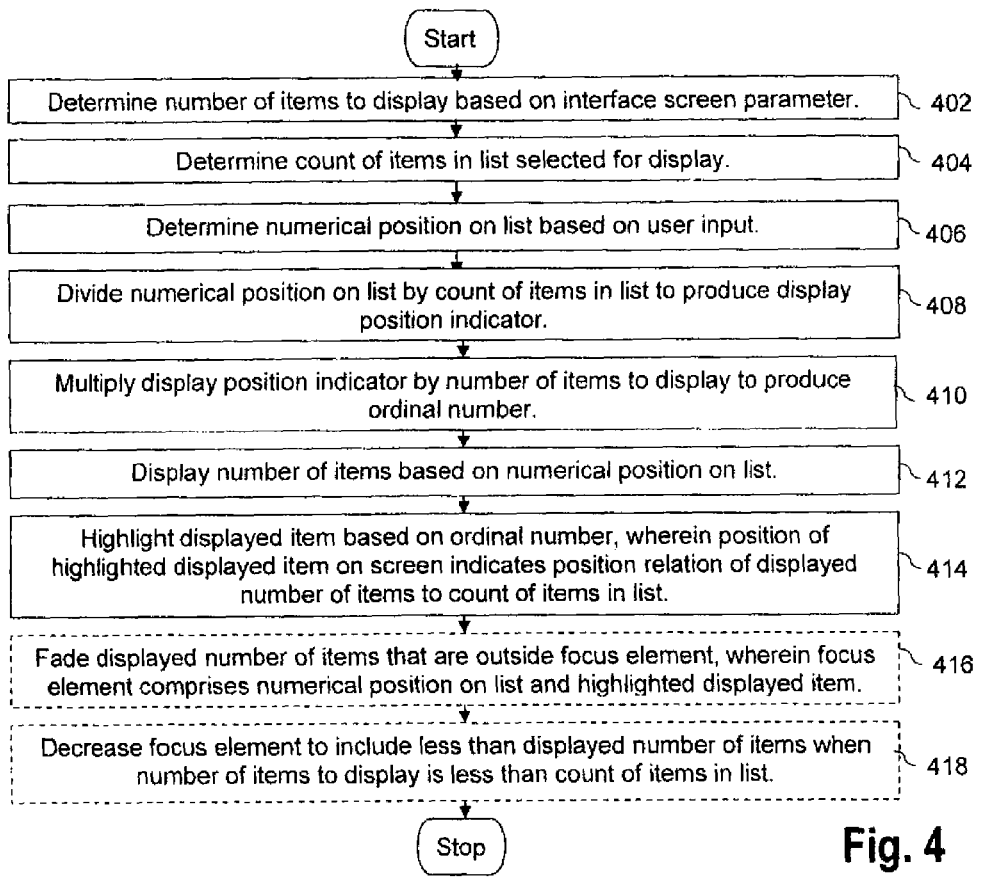
FIG. 4 illustrates an exemplary method for user interface navigation according to some embodiments of the disclosure.

FIG. 4 illustrates an exemplary method for user interface navigation according to an embodiment of the present disclosure. Execution of the method enables a device user to determine the relative position of displayed items from a list to other items in the list.

In box 402, a number of items to display is determined based on an interface screen parameters. For example, the user interface determines 5 items to display based on the interface screen size of the display 104, the current resolution of the display 104, and any user preferences that may be in effect for the display 104.

In box 404, a count of items in a list selected for display is determined. For example, the user interface determines that 26 items (item A to item Z) are in the list of items selected for potential display by the user of the device 102.

In box 406, a numerical position on the list is determined based on user input. For example, the user interface determines that the device user uses the directional pad 108 to traverse to the $15^{th}$ item on the list, which is item O 220 in FIG. 2B. The device user may also focus on a list position based on inputs from the directional pad 108 and an alphanumeric key. For example, the device user clicks the directional pad 108 towards a downward position while selecting the alphanumeric key that corresponds to O, which results in traversing to the first item in the list that begins with the letter O. Additionally, the device user may stream to a list position based on holding the directional pad 108. For example, the device user presses and holds the directional pad 108 in a downward position until the user sees the first item in the list that begins with the letter O. Furthermore, the device user may focus on a list position based on double-clicking the directional pad 108. For example, the device user double-clicks the directional pad 108 towards a downward position, which results in traversing to a next section or chapter in the list. The list of items may include pre-defined sections or chapters of large numbers of items for the purpose of enabling quicker list navigation. The user may repeat the double-clicking until the user sees an item in the list that begins with the letter O.

The user interface may determine the numerical position on the list based on the device user using the directional pad 104 to traverse to the $15^{th}$ item on the list, item O 220 in FIG. 2B, which results in the display 104 displaying the range of items 212-220. The user interface may determine the numerical position on the list based on the first displayed item, the last displayed item, a middle displayed item, or a displayed item that is focused on by the device user. Any of the displayed items 212-220 may be used to represent where the displayed items 212-220 are in position relation to the un-displayed items in the list.

In box 408, the numerical position on the list is divided by the count of items in the list to produce a display position indicator. For example, the user interface divides the 15th position on the list by the 26 items in the list to produce a display position indicator of 0.5769.

In box 410, the display position indicator is multiplied by the number of items to display to produce an ordinal number. For example, the user interface multiplies the display position indicator of 0.5769 by the 5 items to display on the interface screen to produce a result of 2.8845, which may be rounded to 3 to produce the ordinal number of $3^{rd}$.

In box 412, the number of items is displayed based on the numerical position on the list. For example, the user interface displays 5 items on the display 104, including the 15th position on the list. Although in FIG. 2B the display 104 depicts items 212-220, which are the $11^{th}$ to the $15^{th}$ items on the list, in other examples the display 104 may also depict the $15^{th}$ to the $19^{th}$ items on the list, or any other combination of 5 items that includes the $15^{th}$ item.

In box 414; a displayed item is highlighted based on the ordinal number, wherein a position of the highlighted displayed item on a screen indicates a position relation of the displayed number of items to the count of items in the list. For example, the user interface highlights the item M 216, which is the $3^{rd}$ of the displayed items, based on the ordinal number of $3^{rd}$, which the user interface produced in box 410. The position relation of the highlighted $3^{rd}$ item of the displayed 5 items indicates a position relation of the 5 displayed items to the 26 items in the list. Because the highlighted $3^{rd}$ item of the 5 displayed items has 2 displayed items before it and 2 displayed items after it, the highlighted $3^{rd}$ item indicates to the device user that the number of items on the list above the 5 displayed items is approximately equal to the number of items on the list below the 5 displayed items. In this example, the two ranges represented by the items 212 and 214 that are depicted above the highlighted item M 216 represent 10 items, while the two ranges represented by the items 218 and 220 that are depicted below the highlighted item M 216 represent 11 items.

The device user may use the position relation of the highlighted item to determine navigation decisions. For example, if the device user feels that traversing the list has gone quickly, and the highlighted item indicates that the number of items remaining on the list is approximately the same as the number of items already traversed, the user may decide to continue traversing the list in the same manner. However, if the device user feels that traversing the list has gone slowly, and the highlighted item indicates that the number of items remaining on the list is approximately the same as the number of items already traversed, the user may decide to stop traversing the list or to traverse the list in a different manner.

The numerical position on the list is the highlighted displayed item when the count of items is not greater than the number of items to display. For example, if the list of items includes only 5 items, and the device user has focused on the $4^{th}$ item on the list, the user interface highlights the $4^{th}$ item of the displayed items. The display 104 may indicate to the device user that the entire list is displayed by depicting a termination of the list before the $1^{st}$ item and after the $5^{th}$ item, or by other indicators such as icons, symbols, or text notices.

In box 416, the displayed number of items that are outside a focus element are optionally faded, wherein the focus element includes the numerical position on the list and the highlighted displayed item. For example, the user interface fades the 2 displayed items 232 and 240 that are outside the focus element 242 in FIG. 2D. The focus element 242 includes the numerical position on the list, such as the focused on item S 236, and the highlighted displayed item, such as the item T 238. Because of the objective to indicate the focused on item and the position relation to the device user, the focus element 242 may be defined to include both the focused on item and the highlighted item. For example, if the user focuses on item U 240, the focus element 242 may include the item U 240, but may no longer include the item R 234. However, the focus element 242 continues to include the item T 238, which is highlighted to indicate the position relation.

In box 418, the focus element is optionally decreased to include less than the displayed number of items when the count of items in the list is less than the number of items to display. For example, if the list includes only 4 items and the display 104 may display 5 items, the user interface decreases the size of the focus element 242 from 3 items to 2 items. The decreased focus element 242 results in the possibility of the display 104 simultaneously depicting items both before and after the decreased focus element 242.

Figure 5:
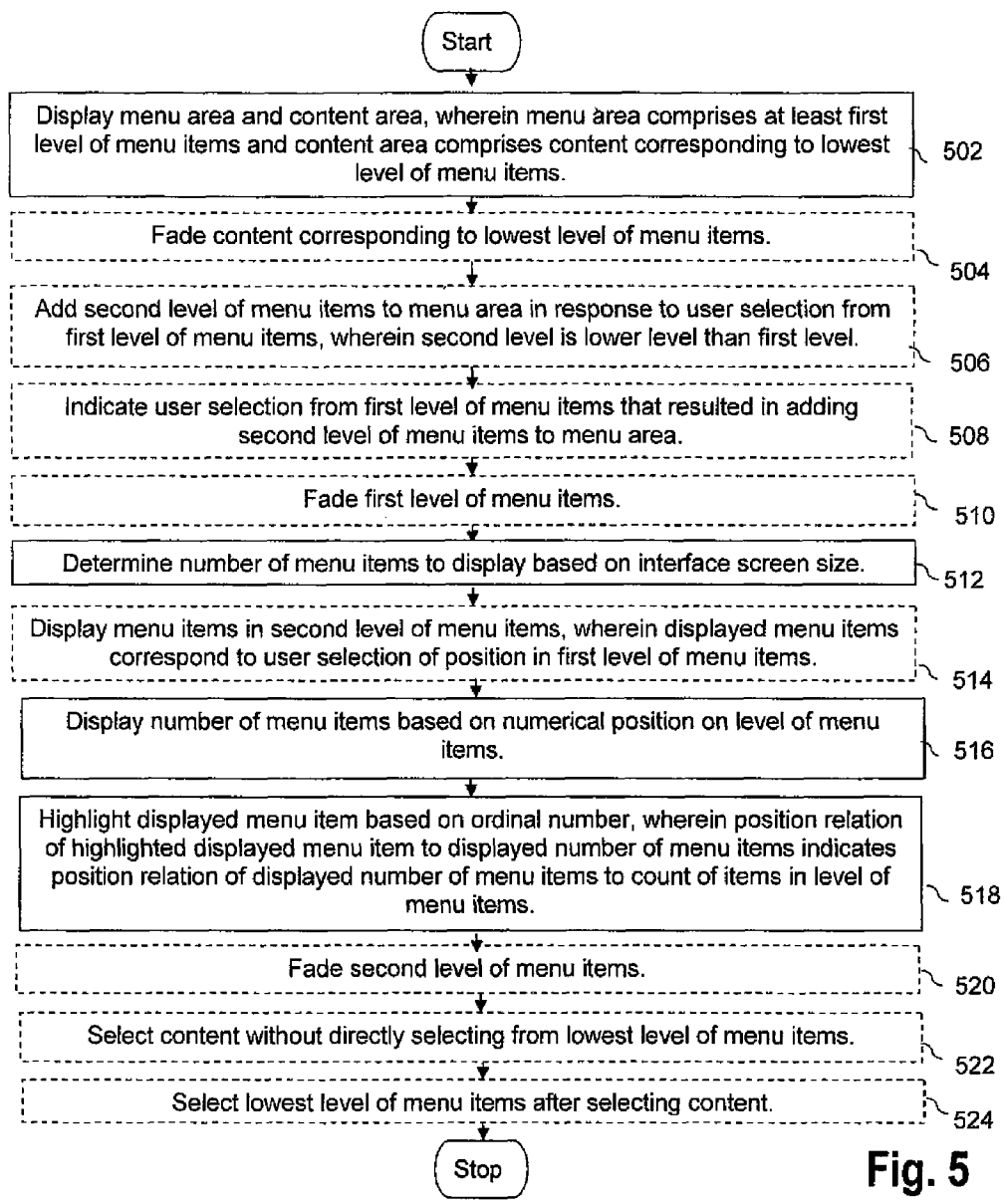
FIG. 5 illustrates another exemplary method for user interface navigation according to some embodiments of the disclosure.

FIG. 5 illustrates another exemplary method for user interface navigation according to an embodiment of the present disclosure. Execution of the method enables the device user to simultaneously identify both past selections and possible future selections while navigating through menu items and content items.

In box 502, a menu area and a content area are displayed, wherein the menu area includes at least a first level of menu items and the content area includes content corresponding to the lowest level of menu items. For example, as depicted in FIG. 3A, the user interface displays the menu 302 area and the content area 304, wherein the menu area 302 includes the level of menu items 306-316 and the content area 304 includes the content items 318-328 that correspond to the level of menu items 306-316, specifically corresponding to menu item my stuff 306. The content corresponding to the lowest level of menu items may include box art for a digital video disc, a compact disc, and/or a game.

In box 504, the content corresponding to a lowest level of menu items is optionally faded. For example, in FIG. 3A the user interface fades the content items 318-328 to shift the focus of the device user from the potentially available content items 318-328 to the currently available menu items 306-316. In this example, the user interface fades the content items 318-328 by depicting the content items 318-328 in a smaller size than the content items 354-364 in FIG. 3B. The user interface may be able to display a larger number of potentially available content items 318-328 by reducing the size of the potentially available content items 318-328.

In box 506, a second level of menu items is optionally added to the menu area in response to a user focus on the first level of menu items, wherein the second level is a lower level than the first level. For example, as depicted in FIG. 3B, the user interface adds the second menu area 330 to the menu area 302 in response to a user focus on the menu item movies 308 of the first level of menu items 306-316, where the second menu area 330 includes the second level of menu items 332-352. Although FIG. 3B includes two menu areas, the display 104 may depict any number of menu areas. The first level and the second level may be levels within a tree data structure, which is an information graph in which any two points on the information graph are connected by at least one path.

In box 508, the user selection from the first level of menu items that resulted in moving focus to the second level of menu items to the menu area is optionally indicated. For example, in FIG. 3C the user interface indicates the user selection of the menu items movies 308 from the first level of menu items 306-316 that resulted in moving focus to the second level of menu items 332-352 to the menu area 330. In this example, the user interface highlights the menu item movies 308 to indicate that selection of the menu items 308 resulted in moving focus to the menu items 332-352.

In box 510, the first level of menu items is optionally faded. For example, in FIG. 3C the user interface fades the first level of menu items 306-316 to shift the focus of the device user from the previously available menu items 306-316 to the currently available menu items 332-352. In this example, the user interface fades the first level of menu items 306-316 by depicting the menu items 306-316 in smaller font than the menu items 332-352. Because the user interface may fade previous levels of menu items, the display 104 may depict any number of levels of menu items by fading previously available levels of menu items.

In box 512, a number of menu items to display is determined based on an interface screen parameter. For example, the user interface determines to display 11 menu items in the second menu area 330 based on the interface screen size, as depicted in FIG. 3B.

In box 514, menu items in the second level of menu items are optionally displayed, wherein the displayed menu items correspond to a user position in the first level of menu items. For example, as depicted in FIG. 3B, the user interface displays the menu items 332-352 in the second menu area 330, wherein the displayed menu items 332-352 correspond to the user position on the first level of menu items 306-316, which is the menu item movies 308. Even when the device user has not yet selected the menu item 308, the user interface displays the menu items 332-352 that correspond to the menu item movies 308 because the user's current position in the menu area 302 corresponds to the menu item movies 308. In this example, the user's current position in the menu area 302 is the menu item movies 308 based on user input from the keys 106 and/or the directional pad 108 that have traversed the user position from the menu item my stuff 306 to the menu item movies 308. The displayed menu items 332-352 that correspond to the user position of menu item movies 308 may indicate a first available selection from the second menu area 330 for the selection of the menu item movies 308. If the device user selects the menu item movies 308, the first available selection from the second level of menu item 332-353 in the second menu area may be the menu item new releases 332. The display 104 indicates the first available selection for the user based on the user's position corresponding to the menu item movies 308 by highlighting the menu item new releases 332.

In box 516, the number of menu items is displayed based on a numerical position on the level of menu items. For example, in order to display the default first position, new releases 332, on the second level of menu items, the user interface displays menu items 1 to 11 from the second level of menu items.

In box 518, a displayed menu item is highlighted, wherein a position relation of the highlighted displayed menu item to the displayed number of menu items indicates a position relation of the displayed number of menu items to a count of items in a level of menu items. For example, the user interface highlights new releases 332, wherein a position relation of the highlighted displayed menu item, the first menu item new releases 332, to the 11 displayed number of menu items indicates a position relation of the 11 displayed number of menu items to a total count of items in the second level of menu items. In this example, highlighting the first menu item out of 11 displayed menu items indicates an approximate ratio of 1:11 between the 11 displayed menu items to a total number of second level menu items. This ratio indicates to the user that a significant amount of time may be required to completely traverse the list of approximately 121 (11 times 11) menu items in the second menu level.

In box 520, the second level of menu items is optionally faded. For example, in FIG. 3B the user interface fades the second level of menu items 332-352 to shift the focus of the device user from the potentially available menu items 332-352 to the currently available menu items 306-316. In this example, the user interface fades the second level of menu items 332-352 by depicting the menu items 332-352 in smaller font than the menu items 306-316. The user interface may be able to display a larger number of potentially available menu items 332-352 by reducing the font size of the potentially available menu items 332-352.

In box 522, the content is optionally selected without directly selecting from the lowest level of menu items. For example, as depicted in FIG. 3B, the device user selects the new release movie K 354 without directly selecting from the menu items 332-352 by using the keys 106 and/or the directional pad 108 to bypass the menu items 332-352 and select the new release movie K 354. One reason why the user interface displays content items is that when the device user views the desired content item in the content area 304, the user may select the content item directly without traversing through intermediate levels of menu items.

In box 524, the lowest level of menu items is optionally selected after selecting the content. For example, as depicted in FIG. 3B, the device user uses the keys 106 and/or the directional pad 108 to select the most popular 334 menu item from the lowest level of menu items 332-352 after selecting the new release movie K 354 because the device user wants to watch a popular movie instead of the new release movie K 354. The user interface enables the device user to select from the lowest level of menu items without starting from the highest level of menu items when the device user decides that the selection of a content item is not the current desired selection.

Figure 6:
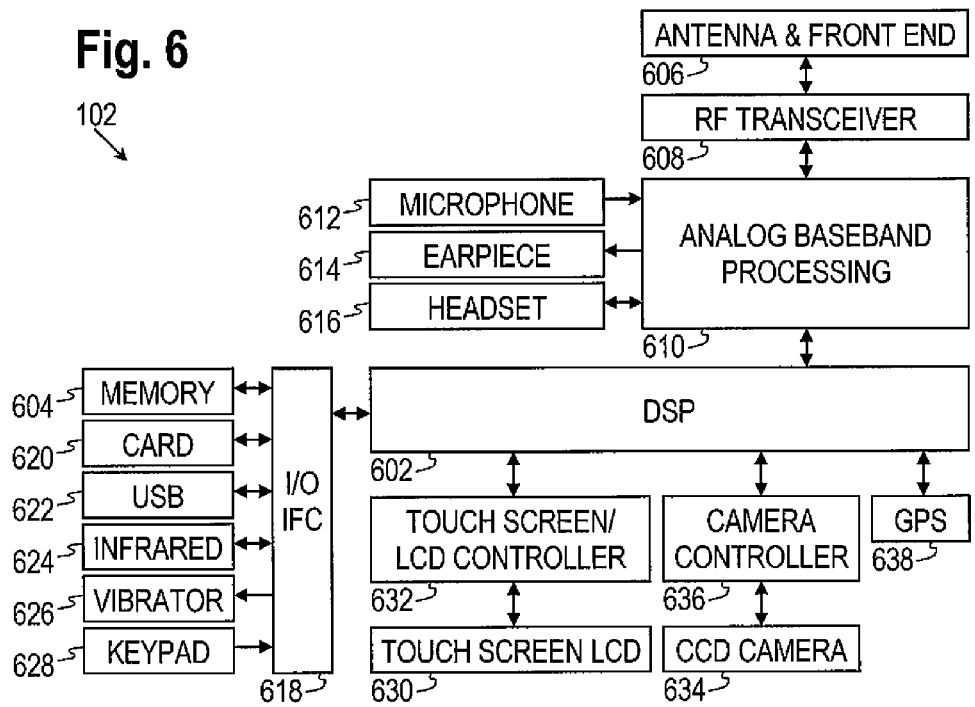
FIG. 6 illustrates an exemplary block diagram of an illustrative device.

FIG. 6 illustrates an exemplary block diagram of the device 102. While a variety of known components of devices 102 are depicted, in an embodiment a subset of the listed components and/or additional components not listed may be included in the device 102. The device 102 includes a digital signal processor (DSP) 602 and a memory 604. As shown, the device 102 may further include an antenna and front end unit 606, a radio frequency (RF) transceiver 608, an analog baseband processing unit 610, a microphone 612, an earpiece speaker 614, a headset port 616, an input/output interface 618, a removable memory card 620, a universal serial bus (USB) port 622, an infrared port 624, a vibrator 626, a keypad 628, a touch screen liquid crystal display (LCD) with a touch sensitive surface 630, a touch screen/LCD controller 632, a charge-coupled device (CCD) camera 634, a camera controller 636, and a global positioning system (GPS) sensor 638. In an embodiment, the device 102 may include another kind of display that does not provide a touch sensitive screen. In an embodiment, the DSP 602 may communicate directly with the memory 604 without passing through the input/output interface 618.

The DSP 602 or some other form of controller or central processing unit operates to control the various components of the device 102 in accordance with embedded software or firmware stored in memory 604 or stored in memory contained within the DSP 602 itself. In addition to the embedded software or firmware, the DSP 602 may execute other applications stored in the memory 604 or made available via information carrier media such as portable data storage media like the removable memory card 620 or via wired or wireless network communications. The application software may comprise a compiled set of machine-readable instructions that configure the DSP 602 to provide the desired functionality, or the application software may be high-level software instructions to be processed by an interpreter or compiler to indirectly configure the DSP 602.

The antenna and front end unit 606 may be provided to convert between wireless signals and electrical signals, enabling the device 102 to send and receive information from a cellular network or some other available wireless communications network or from a peer device 102. In an embodiment, the antenna and front end unit 606 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 606 may include antenna tuning and/or impedance matching components, RF power amplifiers, and/or low noise amplifiers.

The RF transceiver 608 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 610 and/or the DSP 602 or other central processing unit. In some embodiments, the RF transceiver 608, portions of the antenna and front end 606, and the analog baseband processing unit 610 may be combined in one or more processing units and/or application specific integrated circuits (ASICs).

The analog baseband processing unit 610 may provide various analog processing of inputs and outputs, for example analog processing of inputs from the microphone 612 and the headset port 616 and outputs to the earpiece speaker 614 and the headset port 616. To that end, the analog baseband processing unit 610 may have ports for connecting to the built-in microphone 612 and the earpiece speaker 614 that enable the device 102 to be used as a cell phone. The analog baseband processing unit 610 may further include a port for connecting to a headset or other hands-free microphone and speaker configuration. The analog baseband processing unit 610 may provide digital-to-analog conversion in one signal direction and analog-to-digital conversion in the opposing signal direction. In some embodiments, at least some of the functionality of the analog baseband processing unit 610 may be provided by digital processing components, for example by the DSP 602 or by other central processing units.

The DSP 602 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example in a code division multiple access (CDMA) technology application, for a transmitter function the DSP 602 may perform modulation, coding, interleaving, and spreading, and for a receiver function the DSP 602 may perform despreading, deinterleaving, decoding, and demodulation. In another embodiment, for example in an orthogonal frequency division multiplex access (OFDMA) technology application, for the transmitter function the DSP 602 may perform modulation, coding, interleaving, inverse fast fourier transforming, and cyclic prefix appending, and for a receiver function the DSP 602 may perform cyclic prefix removal, fast fourier transforming, deinterleaving, decoding, and demodulation. In other wireless technology applications, yet other signal processing functions and combinations of signal processing functions may be performed by the DSP 602.

The DSP 602 may communicate with a wireless network via the analog baseband processing unit 610. In some embodiments, the communication may provide Internet connectivity, enabling a user to gain access to content on the Internet and to send and receive e-mail or text messages. The input/output interface 618 interconnects the DSP 602 and various memories and interfaces. The memory 604 and the removable memory card 620 may provide software and data to configure the operation of the DSP 602. Among the interfaces may be the USB port 622 and the infrared port 624. The USB port 622 may enable the device 102 to function as a peripheral device to exchange information with a personal computer or other computer system. The infrared port 624 and other optional ports such as a Bluetooth interface or an IEEE 802.11 compliant wireless interface may enable the device 102 to communicate wirelessly with other nearby devices and/or wireless base stations.

The input/output interface 618 may further connect the DSP 602 to the vibrator 626 that, when triggered, causes the device 102 to vibrate. The vibrator 626 may serve as a mechanism for silently alerting the user to any of various events such as an incoming call, a new text message, and an appointment reminder.

The keypad 628 couples to the DSP 602 via the I/O interface 618 to provide one mechanism for the user to make selections, enter information, and otherwise provide input to the device 102. Another input mechanism may be the touch screen LCD 630, which may also display text and/or graphics to the user. The touch screen LCD controller 632 couples the DSP 602 to the touch screen LCD 630.

The CCD camera 634 enables the device 102 to take digital pictures. The DSP 602 communicates with the CCD camera 634 via the camera controller 636. The GPS sensor 638 is coupled to the DSP 602 to decode global positioning system signals, thereby enabling the device 102 to determine its position. In another embodiment, a camera operating according to a technology other than Charge Coupled Device cameras may be employed. Various other peripherals may also be included to provide additional functions, e.g., radio and television reception.

Figure 7:
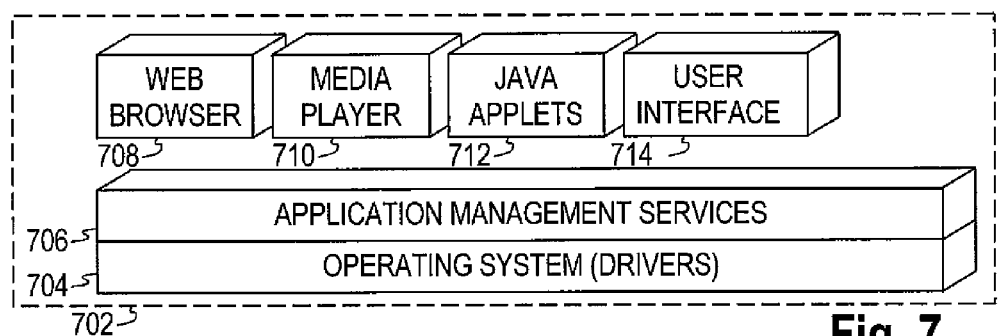
FIG. 7 illustrates an exemplary block diagram of an illustrative software configuration for a device.

FIG. 7 illustrates an exemplary software environment 702 that may be implemented by the DSP 602. The DSP 602 executes operating system drivers 704 that provide a platform from which the rest of the software operates. The operating system drivers 704 provide drivers for the device hardware with standardized interfaces that are accessible to application software. The operating system drivers 704 include application management services ("AMS") 706 that transfer control between applications running on the device 102. Also shown in FIG. 7 are a web browser application 708, a media player application 710, JAVA applets 712, and the user interface 714. The web browser application 708 configures the device 102 to operate as a web browser, allowing a user to enter information into forms and select links to retrieve and view web pages. The media player application 710 configures the device 102 to retrieve and play audio or audiovisual media. The JAVA applets 712 configure the device 102 to provide games, utilities, and other functionality. The user interface 714 enables the device user to identify the relative position of displayed items to other items in a list. The user interface 714 also enables the device user to simultaneously identify both past selections and possible future selections while navigating through menu items and content items.

The system described above may be implemented on any general-purpose computer with sufficient processing power, memory resources, and network throughput capability to handle the necessary workload placed upon it. FIG. 8 illustrates a typical, general-purpose computer system suitable for implementing one or more embodiments disclosed herein. The computer system 880 includes a processor 882 (which may be referred to as a central processor unit or CPU) that is in communication with memory devices including secondary storage 884, read only memory (ROM) 886, random access memory (RAM) 888, input/output (I/O) devices 890, and network connectivity devices 892. The processor may be implemented as one or more CPU chips.

The secondary storage 884 is typically comprised of one or more disk drives or tape drives and is used for non-volatile storage of data and as an over-flow data storage device if RAM 888 is not large enough to hold all working data. Secondary storage 884 may be used to store programs which are loaded into RAM 888 when such programs are selected for execution. The ROM 886 is used to store instructions and perhaps data which are read during program execution. ROM 886 is a non-volatile memory device which typically has a small memory capacity relative to the larger memory capacity of secondary storage. The RAM 888 is used to store volatile data and perhaps to store instructions. Access to both ROM 886 and RAM 888 is typically faster than to secondary storage 884.

I/O devices 890 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 892 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 892 may enable the processor 882 to communicate with an Internet or one or more intranets. With such a network connection, it is contemplated that the processor 882 might receive information from the network, or might output information to the network in the course of performing the above-described method steps. Such information, which is often represented as a sequence of instructions to be executed using processor 882, may be received from and outputted to the network, for example, in the form of a computer data signal embodied in a carrier wave Such information, which may include data or instructions to be executed using processor 882 for example, may be received from and outputted to the network, for example, in the form of a computer data baseband signal or signal embodied in a carrier wave. The baseband signal or signal embodied in the carrier wave generated by the network connectivity devices 892 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 882 executes instructions, codes, computer programs, scripts which it accesses from hard disk, floppy disk, optical disk (these various disk based systems may all be considered secondary storage 884), ROM 886, RAM 888, or the network connectivity devices 892. While only one processor 892 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A computer implemented method for user interface navigation, comprising:
   determining a number of items to display based on an interface screen parameter;
   displaying the number of items based on a numerical position on a list selected for display; and
   highlighting a displayed item, wherein a position of the highlighted displayed item on a screen indicates a position relation of the displayed number of items to a total number of items in the list, and wherein the highlighted displayed item is independent of a user focused item.

2. The computer implemented method of claim 1, further comprising:
   determining the total number of items in the list;
   determining the numerical position on the list based on user input;
   dividing the numerical position on the list by the total number of items in the list to produce a display position indicator; and
   multiplying the display position indicator by the number of items to display to produce an ordinal number, wherein highlighting the displayed item is based on the ordinal number.

3. The computer implemented method of claim 2, wherein determining the numerical position on the list based on user input comprises one of focusing on a list position based on at least one of double-clicking a directional pad and inputs from a directional pad and an alphanumeric key or streaming to a list position based on holding a directional pad.

4. The computer implemented method of claim 1, wherein the position of the highlighted displayed item on the screen is relative to at least one of a focus element and the displayed number of items.

5. The computer implemented method of claim 1, further comprising fading the displayed number of items that are outside a focus element, wherein the focus element comprises the numerical position on the list and the highlighted displayed item.

6. The computer implemented method of claim 5, further comprising decreasing the focus element to include less than the displayed number of items when the total number of items in the list is less than the number of items to display.

7. The computer implemented method of claim 1, wherein fading comprises at least one of decreasing a font size, increasing a transparency level, decreasing a brightness level, and decreasing a contrast level.

8. The computer implemented method of claim 1, wherein the position of the highlighted displayed item on the screen indicates an approximate ratio of non-displayed items above the displayed items of the list to non-displayed items below the displayed items of the list.

9. A system for user interface navigation, comprising:
   a processor; and
   a user interface, when executed by the processor, to display a menu area and a content area, wherein the menu area comprises at least a first level of menu items and the content area comprises content corresponding to a lowest level of menu items, to determine a number of menu items to display based on an interface screen parameter, to display the number of menu items based on a numerical position on the first level of menu items, to highlight a displayed menu item, wherein a position of the highlighted displayed menu item on a screen indicates a position relation of the displayed number of menu items to a total number of items in the first level of menu items, and to add a second level of menu items to the menu area in response to a user focus on the first level of menu items, wherein the second level is a lower level than the first level, and wherein the highlighted displayed menu item is independent of the user focused item.

10. The system of claim 9, wherein the user interface is further configured to select the content without directly selecting from the lowest level of menu items.

11. The system of claim 10, wherein the user interface is further configured to select the lowest level of menu items after selecting the content.

12. The system of claim 9, wherein the user interface is further configured to indicate the user selection from the first level of menu items that resulted in moving focus to the second level of menu items in the menu area.

13. The system of claim 9, wherein the user interface is further configured to fade the first level of menu items.

14. The system of claim 9, wherein the user interface is further configured to fade the content corresponding to a lowest level of menu items.

15. The system of claim 9 wherein the user interface provides control signals to at least one of a personal computer, a mobile telecommunication device, a mobile device, a personal digital assistant, a mobile computer, a handheld gaming device, a wireless mobile device, a pager, a portable computer, a tablet computer, a laptop computer, a digital camera, a digital music player, a digital video disc player, a set top box, and a digital calculator.

16. A system for user interface navigation, comprising:
a processor; and
a user interface, when executed by the processor, to display a menu area and a content area, wherein the menu area comprises a first level of menu items and a second level of menu items, and the content area comprises content corresponding to the second level of menu items, wherein the second level is a lower level than the first level, to determine a number of menu items to display based on an interface screen parameter, to display the number of menu items based on a numerical position on the second level of menu items, to highlight a displayed menu item, wherein a position of the highlighted displayed menu item on a screen indicates a position relation of the displayed number of menu items to a total number of items in the second level of menu items, and to display menu items in the second level of menu items, wherein the displayed menu items correspond to a user position in the first level of menu items, and wherein the highlighted displayed item is independent of a user focused item.

17. The system of claim 16, wherein the first level and the second level are levels within a tree data structure.

18. The system of claim 16, wherein the displayed menu items indicate a first available selection from the second level of menu items.

19. The system of claim 16, wherein the user interface is further configured to fade the second level of menu items.

20. The system of claim 16, wherein the content corresponding to the second level of menu items includes box art for at least one of a digital video disc, a compact disc, and a game.

* * * * *